(12) United States Patent
Banerjee

(10) Patent No.: US 8,537,837 B2
(45) Date of Patent: *Sep. 17, 2013

(54) SWITCH WITH VIRTUAL NETWORK IDENTIFIER RE-WRITE CAPABILITY

(75) Inventor: Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/228,284

(22) Filed: Sep. 8, 2011

(65) Prior Publication Data

US 2011/0317707 A1    Dec. 29, 2011

Related U.S. Application Data

(63) Continuation of application No. 11/868,756, filed on Oct. 8, 2007, now Pat. No. 8,036,229.

(51) Int. Cl.
*H04L 12/28* (2006.01)
*H04L 12/56* (2006.01)

(52) U.S. Cl.
USPC .......................................... 370/397; 370/409

(58) Field of Classification Search
None
See application file for complete search history.

(56) References Cited

U.S. PATENT DOCUMENTS

| | | | |
|---|---|---|---|
| 5,892,912 A | 4/1999 | Suzuki et al. | |
| 6,876,656 B2 | 4/2005 | Brewer et al. | |
| 7,283,746 B2 * | 10/2007 | Ikeda | 398/46 |
| 8,040,814 B2 * | 10/2011 | Takatori | 370/249 |
| 2004/0088574 A1 * | 5/2004 | Walter et al. | 713/201 |
| 2004/0151188 A1 | 8/2004 | Maveli et al. | |
| 2005/0036499 A1 * | 2/2005 | Dutt et al. | 370/401 |
| 2005/0053073 A1 * | 3/2005 | Kloth et al. | 370/395.41 |
| 2006/0092932 A1 | 5/2006 | Ghosh et al. | |
| 2006/0159081 A1 * | 7/2006 | Dropps | 370/389 |
| 2007/0058619 A1 | 3/2007 | Gopol Gowda et al. | |
| 2009/0083445 A1 * | 3/2009 | Ganga | 709/250 |

OTHER PUBLICATIONS

US Office Action dated Oct. 21, 2009 for U.S. Appl. No. 11/868,756.
US Final Office Action dated Apr. 27, 2010 for U.S. Appl. No. 11/868,756.
Notice of Allowance dated Jun. 8, 2011 for U.S. Appl. No. 11/868,756.

* cited by examiner

*Primary Examiner* — Eunsook Choi
(74) *Attorney, Agent, or Firm* — Weaver Austin Villeneuve & Sampson LLP

(57) ABSTRACT

A switch includes a processor, an ingress port having ingress port logic, and an egress port. It may also include a virtual network identifier rewrite component for rewriting a virtual network identifier in a data frame received the ingress port with a new virtual network identifier. Also included is a virtual network identifier rewrite rule set, where a rule may have one or more of the following: a received virtual network identifier, a source Fiber Channel identifier (FCID) address, an ingress port identifier, and a new virtual network identifier. The ingress port logic may insert a received virtual network identifier into the data frame received at the ingress port, where the virtual network identifier may correspond to the ingress port. The virtual network identifier rewrite component may assign the new virtual network identifier to the data frame according to a specific virtual network identifier rewrite rule.

20 Claims, 9 Drawing Sheets

FIG. 6

| VSAN | DEST. FC ID | OUTPUT PORT ID |
|---|---|---|
| C | 10.*.* | P1 |
| D | 20.*.* | P2 |
| ⋮ | ⋮ | |

FIG. 7

| VSAN | WWN | FC ID | INPUT PORT ID |
|---|---|---|---|
| C | 2A:04 ... EB | 10.7.3 | P3 |
| ⋮ | ⋮ | | |

FIG. 8

| VSAN | PortID | SOURCE FC ID | DEST. FCID | VSAN ID-NEW |
|---|---|---|---|---|
| A | P3 | 10.4.9 | < * > | D |
| A | P3 | 10.4.10 | < * > | B |
| ⋮ | ⋮ | ⋮ | ⋮ | |

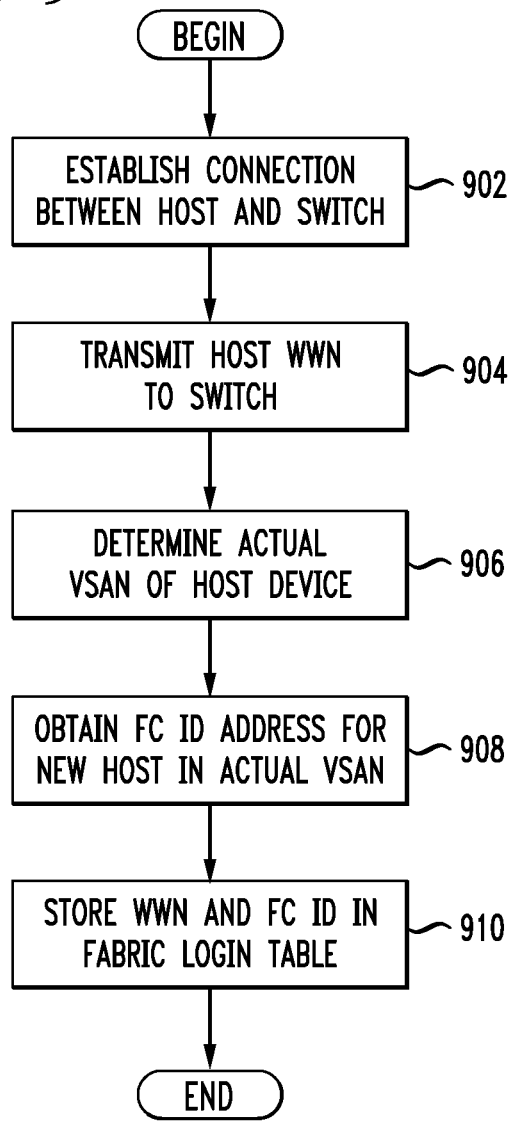

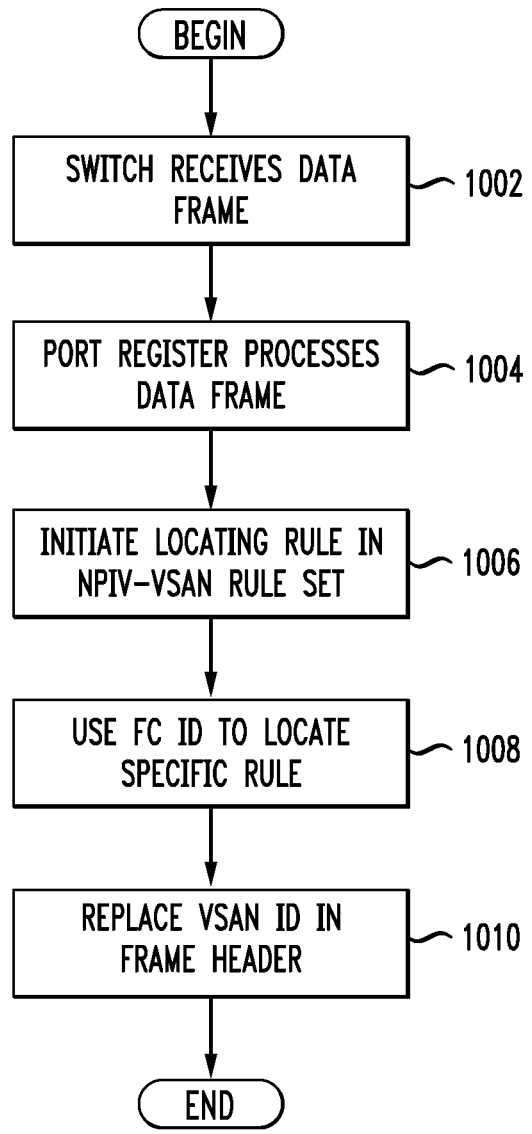

SWITCH WITH VIRTUAL NETWORK IDENTIFIER RE-WRITE CAPABILITY

CROSS REFERENCE TO RELATED PATENT APPLICATION

This application is a continuation and claims priority of U.S. patent application Ser. No. 11/868,756, entitled SWITCH WITH VIRTUAL NETWORK IDENTIFIER RE-WRITE CAPABILITY, by Subrata Banerjee, filed Oct. 8, 2007, which is incorporated herein by reference in its entirety for all purposes.

BACKGROUND OF THE INVENTION

The present invention relates to switches having virtual networking capability. As the amount of data used in enterprises and organizations grows, reliance on storage area networks (SANs) has been increasing. A networking technique that has grown since the advent of SANs is the concept of creating virtual networks within a SAN. One example of a virtual network is a virtual storage area network or VSAN.

Using VSANs and other virtual network and switch technology, a switch may be segmented or divided into multiple "virtual" or logical switches, each essentially carved out from the ports of the physical switch. In a simple illustration, a company may have four departments and have one physical switch that can be used to implement four virtual switches, each virtual switch creating its own VSAN. This allows the different departments to share the same physical infrastructure and network connections of the company while benefiting from the advantages of maintaining separate virtual networks. A host or storage device will typically only communicate and recognize devices in the same VSAN. A port of a physical switch may correspond to a specific VSAN and host devices connected to ports of the same VSAN can communicate and route data with one another. They are generally unaware of devices and components in other VSAN. Host devices, such as high-end PCs and servers, are becoming more intelligent and sophisticated. However, a connection between a host server device, for example, including all virtual devices and processes within the host, and the switch is operable in only one VSAN. This limits the capabilities of virtual switching technology, such as VSAN, in a network.

BRIEF DESCRIPTION OF THE DRAWINGS

References are made to the accompanying drawings, which form a part of the description and in which are shown, by way of illustration, particular embodiments:

FIG. 6 is a block diagram of an example forwarding table having a VSAN ID storage area, a destination FCID storage area, and an output port ID;

FIG. 7 is a block diagram of an example fabric login table having a WWN storage area, a source FCID storage area, a VSAN ID storage area, and ingress port ID;

FIG. 8 is a data configuration diagram showing an example of NPIV-VSAN rule set shown in FIGS. 2 and 3 in accordance with particular embodiments;

FIG. 9 is a flow diagram of an example process of establishing a new connection between a physical or virtual host device and a switch in accordance with particular embodiments;

FIG. 10 is a flow diagram of an example process of modifying a VSAN ID in a data frame header upon receiving a data frame at a switch via a connection with a host device in accordance with particular embodiments;

DESCRIPTION OF EXAMPLE EMBODIMENTS

Figure 1:
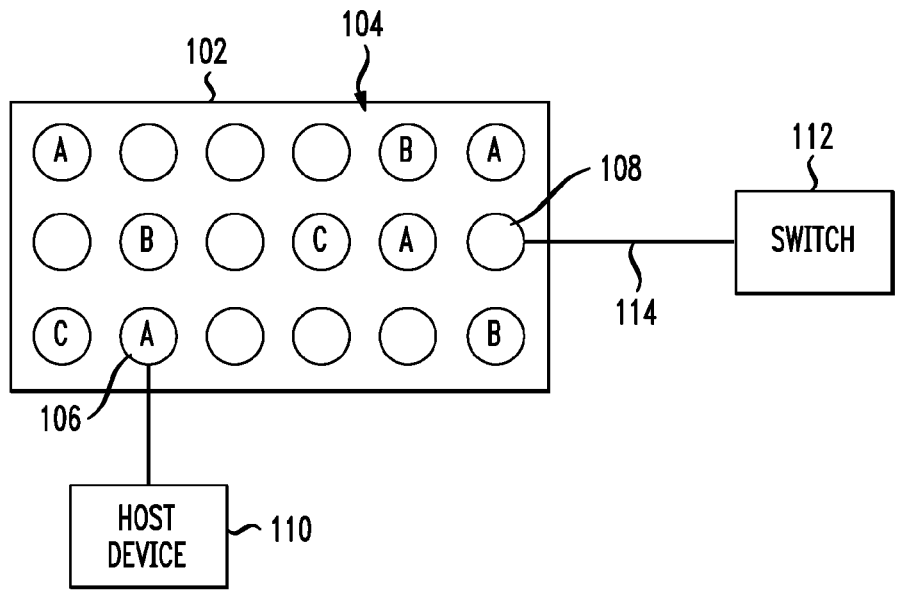
FIG. 1 is a logical block diagram of an example network in accordance with particular embodiments.

In this application, numerous specific details are set forth in order to provide a thorough understanding of the example embodiments. It will be obvious, however, to one skilled in the art, that these embodiments may be practiced without some or all of these specific details. In other instances, well known process steps have not been described in detail in order to not obscure the example embodiments.

Overview

In one embodiment, a switch includes a processor, an ingress port having ingress port logic, and an egress port. It may also include a virtual network identifier rewrite component for rewriting a virtual network identifier in a data frame received the ingress port with a new virtual network identifier. Also included is a virtual network identifier rewrite rule set, where a rule may have one or more of the following: a received virtual network identifier, a source Fibre Channel identifier (FCID) address, an ingress port identifier, and a new virtual network identifier. The ingress port logic may insert a received virtual network identifier into the data frame received at the ingress port, where the virtual network identifier may correspond to the ingress port. The virtual network identifier rewrite component may assign the new virtual network identifier to the data frame according to a specific virtual network identifier rewrite rule.

In another embodiment, a method is described in which a switch or other network data routing component receives a data frame at an ingress port, the data frame having been transmitted from a host device assigned to operate in a first virtual network. The host device may execute on a physical host device assigned to operate in a second virtual network. The data frame may contain a source address corresponding to the first host device. An initial virtual network identifier that corresponds to the second virtual network (of the physical host device) may be inserted into the data frame once it is received at the switch or component. The switch determines that the data frame originated from the first host device operating in the first virtual network. The initial virtual network identifier may be rewritten with a replacement virtual network identifier that corresponds to the first virtual network, thereby facilitating routing of the data frame to an intended destination host device. The data frame may then be forwarded to the destination host device which has a destination address in the first virtual network.

Example Embodiments

The figures and descriptions provided herein are of methods and systems that expand the capabilities of virtual switch technologies, such as virtual storage area networks (VSAN). In particular embodiments, an input port of a switch, referred to as an F-port for certain types of switches, operates in multiple virtual networks, rather than being limited to one network. Thus, a host device and all virtual devices within the host which are connected to a single F-port of a switch may be in different virtual networks. VSAN is used only for providing examples of particular embodiments. Embodiments are not limited to VSAN; other virtual networking technologies and concepts are applicable to the embodiments described herein.

Generally the host and virtual devices are not aware of VSAN capabilities in the network, that is, they generally do not have VSAN information in their memories, hardware, firmware, and the like. In particular embodiments, a fabric port (F-port) of a switch is dedicated to one VSAN, for example, the VSAN of the physical host device connected to the port. This may also be true of other types of ports for other types of switches. Once a data frame is received at the switch port, a VSAN identifier in the packet header may be replaced to correspond to the VSAN of the virtual device (executing within the physical host device) sending the frame. The frame may then be forwarded to its destination component based on the new VSAN identifier. Thus, a physical host device in VSAN A and connected to a VSAN A-designated port of a switch may execute virtual devices in VSANs B, C, and D. Upon receiving data from, for example, VSAN C at the VSAN A port, in particular embodiments, the switch performs a specific rewrite of VSAN data in the data frame, such as in the header, to ensure that the frame is forwarded to its intended destination component in VSAN C, rather than being dropped or inadvertently sent to a component having an identical (or similar) address in VSAN A, as described in greater detail below.

Generally, data transmissions are confined to a single VSAN, for example, data sent from a device in VSAN B may only be received by a device or component in VSAN B. In particular embodiments, although components sending data and components receiving data are in the same VSAN, data may take a route via one or more port switches assigned to other VSANs, thereby expanding the capabilities of VSAN and similar logical networking and switching technologies.

FIG. 1 is a logical block diagram of a network in accordance with particular embodiments. A network 100 has a switch 102 with multiple ports 104. In one embodiment, the switch is a Fibre Channel switch, such as those commercially available from Cisco Systems of San Jose, California. Other types of switches may be used in various embodiments. Switch 102 has numerous ports, some of which are shown as ports 104. Ports 104, also referred to as interfaces, are used to connect various network components to switch 102. One type of component is a host device, such as host server 110. Host devices may vary widely depending on context, use, and other characteristics of the network. Examples of host devices include servers, PCs, printers, hand-held devices, and the like.

For the purpose of illustrating one embodiment, host device 110 is characterized as a high-end server having one or multiple CPUs and executing three virtual servers, as described in greater detail below. In other embodiments, host device 110 may be one of a number of different types of network components, such as storage devices, for example, tape back-up systems, CD-ROM storage arrays, and Redundant Array of Independent Disks (RAID) devices. Also connected to switch 102 is another switch 112. Switch 102 may be connected to numerous types of host devices and other switches; those shown in FIG. 1 are merely illustrative. Collectively, these components comprise a SAN. The switches, for example Fibre Channel switches, form a switching fabric.

In a SAN utilizing VSAN technology or similar virtual networking and switching technologies, a switch port may be assigned or designated to a particular VSAN. In particular embodiments, input ports, also referred to as ingress ports or interfaces, in a Fibre Channel switch are fabric ports or F ports, as noted above. Ports labeled as port A in switch 102 are ports in VSAN A; ports labeled as B are ports in VSAN B, and those labeled C are in VSAN C. A port does not have to be a VSAN port; it may simply be a port in the SAN. Thus, ports 104 of switch 102 can be segmented or "carved out" to form VSANs in the SAN. Within each VSAN, devices may be divided into zones, as described below. A port may also be used to transmit data in more than one VSAN when used to connect to another switch. Port 106 in FIG. 1 is in VSAN A and is used to establish a connection with host device 110. In particular embodiments, host device 110 is in VSAN A. Port 108 is not in a VSAN and is used to connect to switch 112 over connection 114. In one embodiment, connections between host and storage devices, switches, and other network components in SANs and VSANs may rely on the Fibre Channel protocol for communications within the switching fabric.

Figure 2:
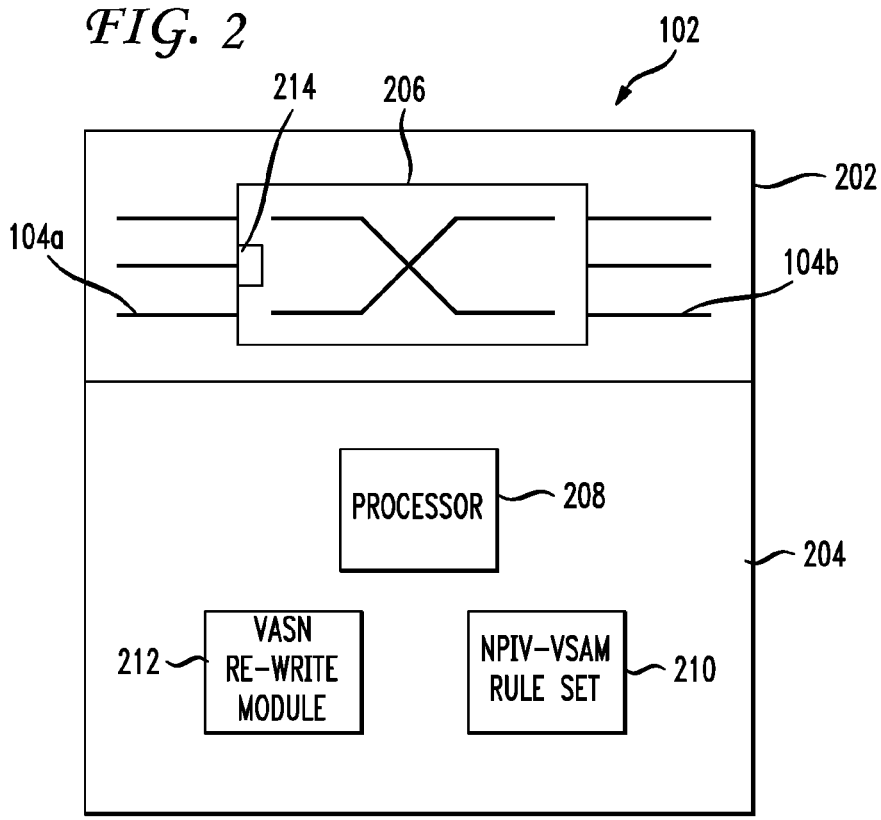
FIG. 2 is a block diagram showing example physical components of a switch in accordance with particular embodiments.

FIG. 2 is a block diagram showing certain physical components of switch 102. A switch 102 includes a data plane 202 and a control plane 204. In data plane 202, the switch includes switching logic 206 connected between two sets of ports 104a and 104b. Switching logic 206 is configured to route or internally switch traffic received on one port set 104a (ingress ports) to another port set 104b (egress ports). Control plane 204 includes a generic or application-specific processor 208 for implementing all the switching functionality and Fibre Channel protocols. In particular embodiments, processor 208 may be implemented in a state machine, a microcontroller, hardware, firmware, programmable logic, or a combination thereof. Also included in switch 102 is a rule set 210 relating to N-port ID virtualization (NPIV) and VSAN. Also included is a VSAN rewrite module 212. These are both described in greater detail below. In particular embodiments, VSAN rewrite module 212 may be stored in a port register or be in switch logic 206. In another embodiment rule set 210 is hard-coded in processor 208. In other embodiments, NPIV-VSAN rule set 210 and/or VSAN re-write module 212 are stored in a line card ternary content address memory (TCAM) in ASIC 214 or in any other suitable memory on switch 102.

Figure 3:
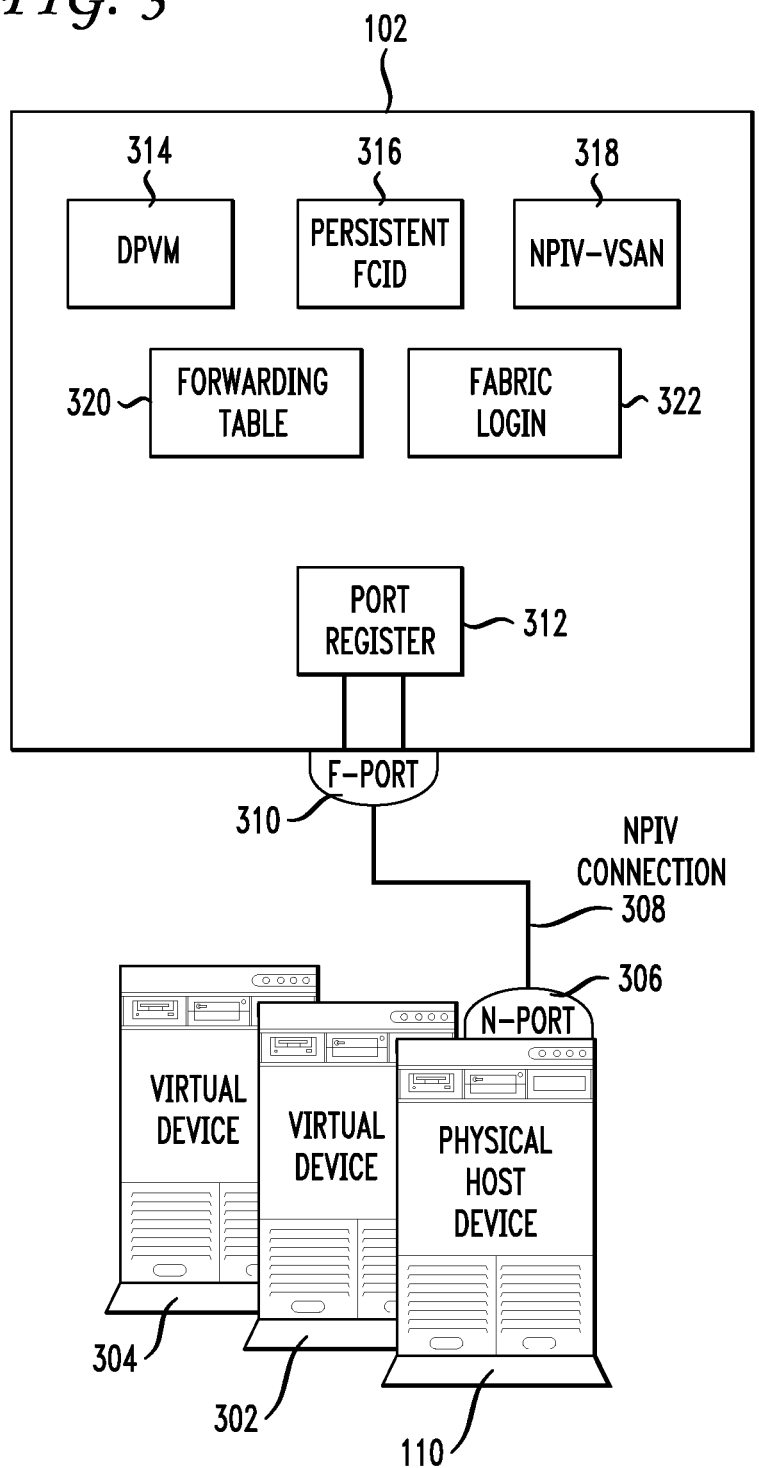
FIG. 3 is a logical block diagram of an example switch, a physical host device, and a connection between the components in accordance with particular embodiments.

FIG. 3 is a logical block diagram of switch 102, physical host device 110, and a connection 310 between the components in accordance with particular embodiments. Physical host device 110 may be a component in the network capable of executing one or more virtual processes or devices. For example, host device 110 may be a high-end server (as shown in FIG. 3) or a PC. Device 110 may be utilized by having multiple virtual servers or PCs executing on the physical device (which, for example, may have one or multiple CPUs, each executing separate jobs), wherein, in one scenario, each virtual device may be dedicated to one group of users. Host devices 110 are becoming increasingly intelligent and powerful, and are efficiently utilized not as a single dedicated network resource, but as multiple virtual devices, each of which may be utilized by a number of users who may now have their own dedicated network resource (server, PC, and the like). The fact that their server is a job running on a single high-end server along with other jobs is often transparent and irrelevant to the end users.

Host device 110 has three virtual devices 302, 304, and 306. In the example where host device 110 is a server, these virtual devices may be virtual servers, each dedicated to, for example, one department in a company, or one function, such as Web server, database server, e-mail server, and so on. For the purposes of illustrating particular embodiments, host device 110 operates in VSAN A and virtual device 302 operates in VSAN B and virtual device 304 operates in VSAN C.

Host device 110 has a port 306 used to establish a physical NPIV connection 308 to switch 102 via F-port 312. In this example, port 306 may be referred to as an N-port. In particular embodiments, host device 110 and virtual devices 302 and 304 share a physical connection 308 under the NPIV standard to transmit data to switch 201. As described above, host device 110, virtual devices 302 and 304, and NPIV connection 308 are unaware of which VSAN they operate in; that is, they do not contain any data or fields that indicate a VSAN identifier or contain VSAN-related information.

Generally, switch 102, such as a Fibre Channel switch or a storage switch, is VSAN-aware and may forward data based on VSAN. As noted above, in contrast, host and storage devices are generally not VSAN-aware. One technique used by a switch to determine which VSAN a data packet is being transmitted in involves examining which port received the data frame which may be dedicated or assigned to a particular VSAN.

In particular embodiments, port register 312, associated with F port 310, stores VSAN data relating to port 310. In one embodiment, port register 312 is implemented as an ASIC chip and performs other port-related functions. As described in detail below, when a data frame is received at port 310 it does not contain any VSAN-related data. One function performed by port register 312 is appending VSAN information to the data frame when the frame is received at port 310, such as by inserting a VSAN identifier into the frame header, the VSAN being determined by the receiving port.

In one embodiment, switch 102 has a domain identifier (domain ID) that is unique to the switch within the network. The domain ID is used in Fibre Channel identifiers or addresses (FCIDs) described in further detail below. In particular embodiments, switch 102 contains certain types of data stored in the form of tables, flat files, rule sets, and the like. These data may include a dynamic port VSAN membership (DPVM) table 314, a persistent FCID table 316, a forwarding table 320, NPIV-VSAN rule set 210, and others. In other embodiments, there may be more tables and data sets than those described here or fewer, for example, wherein certain tables and data sets described are combined or merged into a single data set or where certain data sets are not needed (e.g., the functionality of a data set is provided by a logic module, firmware, an external program, and the like). For example, in one embodiment NPIV-VSAN rule set 210 and forwarding table 320 may be combined. These data sets are described in greater detail below. Switch 102 also has output ports, also known as egress interfaces (not shown), for transmitting data frames to destination host and storage devices. As with ingress F ports, such as port 310, egress ports may be designated to a particular VSAN. For example, a data frame intended for a device in VSAN C is transmitted from a VSAN C egress port of the switch.

As described in FIG. 1, one manifestation of a SAN may be comprised of a fabric switch having one or more Fibre Channel switches and storage and host devices. A host device may have one or more jobs executing as virtual devices or processes. In particular embodiments, when it is determined that a network needs a new physical or virtual host device (or storage device), a network administrator, for example, may make certain updates to tables in the switch to which the new device is connected. For example, specific VSAN-related settings are made in a switch before a virtual or physical host device is connected to a switch. When a virtual device, such as a virtual server, is added to the network, the physical NPIV connection between the host device and the switch already exists (the NPIV connection may be shared by multiple processes or multiple virtual servers). When a new physical host device is added, a physical connection is made between the device's N port and the F port of the switch.

Figure 4:
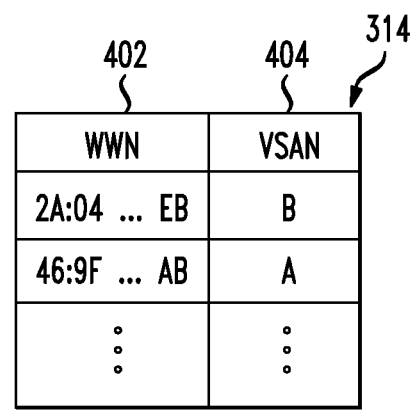
FIG. 4 is a block diagram of an example DPVM table having a world wide name (WWN) storage area and a VSAN identifier storage area.

FIG. 4 is a block diagram of an example DPVM table 314 having a world wide name (WWN) storage area 402, shown as a column, and a VSAN identifier (VSAN ID) storage area 404, also shown as a column. In other embodiments, WWN and VSAN ID may be stored in a flat file or in another type of storage construct. When a new physical or virtual host device needs to be added to a network, an administrator assigns on a WWN for the new host, which acts as a unique identifier for the host within the network. A host's WWN is used to uniquely identify a device within the network. The format and length of a WWN is eight hexadecimal numbers, is derived specifically for a network and may depend on the number of components and devices in the network. If it is decided that the new device should be in a particular VSAN, the VSAN identifier is stored in column 404. Thus, DPVM table 314 provides data on which VSAN a specific component operates in. In one embodiment, a host device not operating in a VSAN may not have an entry in DPVM table 314. In other embodiments, a host device may be in two or more VSANs, in which case the device may have one entry in table 314 with multiple VSAN IDs or have multiple entries, each entry having providing one VSAN ID.

Figure 5:
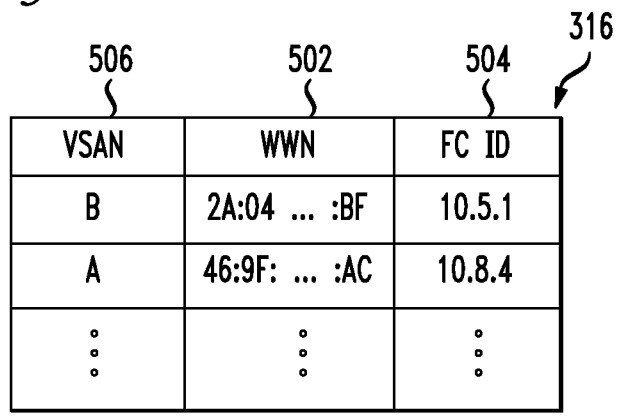
FIG. 5 is a block diagram of an example persistent FCID table having a WWN storage area, an FCID storage area, and a VSAN ID storage area.

FIG. 5A is a block diagram of an example persistent FCID table 316 having a WWN storage area 502, an FCID storage area 504, and a VSAN ID storage area 506. In particular embodiments, WWN storage area 502 has the same characteristics as storage area 402 and is used to store WWNs for virtual and physical host devices in the network that operate in a VSAN. Storage area 504 stores FCID addresses assigned to host devices. When a new device is connected to a switch and the device operates in a VSAN, the switch logic may assign an FCID to the device or the switch may use persistent FCID table 316 to assign an FCID. In particular embodiments, a format of an FCID address consists of a domain ID followed by an area identifier and a port identifier. The domain ID component of the address may be determined by the domain ID of the switch to which the device is connected. Area segment and port segment may be selected by the network administrator. FCID table 316 is used as a type of conditional table: if a specific WWN is received and if there is an entry for the WWN in table 316, then assign the FCID in the entry to the device corresponding to the WWN. In other embodiments, a device having a WWN may not be in a VSAN in which case it may still have an entry in table 316 and have an FCID assigned to it using the table if certain conditions arise.

FIG. 6 is a block diagram of an example forwarding table 320 having a VSAN ID storage area 602, a destination FCID storage area 604 and an output port ID 606, all shown as columns in table 320. VSAN ID storage area 602 has similar characteristics as storage area 404 shown in FIG. 4. Destination FCID area 604 has similar characteristics as storage area 504. Table 320 may be used to determine which host device or other network components a data frame should be forwarded to. In particular embodiments, VSAN IDs in storage area 602 are used to eliminate potential ambiguity as to the destination FCID of a data frame. As described below, it is possible that two or more host devices have the same FCID address, however, such devices may not be in the same VSAN. In one embodiment although destination FCID is stored, it is not used in the VSAN-related functions described in the particular embodiments.

FIG. 7 is a block diagram of an example fabric login table 322 having a WWN storage area 702, a source FCID storage area 704, a VSAN ID storage area 706, and ingress port ID 708, each having similar characteristics as storage areas in the tables described above. In particular embodiments, fabric login table 332 is used as an informational or "look-up" table in that it may be used to obtain data on which FCID addresses were assigned to specific WWNs. For example, after a device has been assigned an FCID, irrespective of how the FCID was assigned, information tying the device's WWN with the FCID is stored in table 322. In other embodiments, these data may be stored in other data sets or tables in switch 102.

VSAN ID and input port ID may be used for control frames and queries made by virtual and host devices to a switch. Such devices may query a switch via a control frame as to which other devices the requesting device may communicate with, i.e., which other devices are in the same VSAN as the requesting device. As described above, this cannot be answered by examining the port VSAN. Fabric login table 322 may be used to determine the actual VSAN of the requesting device. A control frame query may have an FCID and not a WWN. If this is the case, persistent FCID table 316 may not be used. Fabric login table 322 may be used to obtain the actual VSAN from the source FCID and input port ID. A VSAN database may then be used to retrieve the information requested.

In particular embodiments, the data sets described in FIGS. 4 to 7 are stored in various non-volatile memories in switch 102. In other embodiments, some or all of the data sets may be stored in TCAM, in a port ASIC, firmware, hardware, or in other suitable memory in switch 102.

FIG. 8 is a data configuration diagram showing an example of NPIV-VSAN rule set 210 shown in FIGS. 2 and 3 in accordance with particular embodiments. The arrangement, order, and configuration of the fields and data shown in rule set 210 are one example of how the data may be stored. In other embodiments, different arrangements and formats may be used without affecting the functionality of rule set 210, as described below. In one embodiment, a single entry in rule set 210 corresponds to one FCID address. An entry may be created when a host device is connected to switch 102 or whenever it is necessary that a new FCID address is assigned to a device. When a data frame is received by switch 102 and after a VSAN ID has been inserted into the frame header by the port register (if belonging to a specific VSAN), rule set 210 may be utilized to locate a rule corresponding to the data frame. In one embodiment, rule set 210 is searched using the VSAN ID in the data frame or the ID of the F port where the frame was received (this may be inserted into the frame header when the frame is received at switch 102). Rule set 210 also contains a VSAN ID field 802 and a port ID field 804. One or both of these fields may be used to locate the appropriate entry in rule set 210. The entries in NPIV-VSAN rule set 210 may be organized or grouped according to VSAN ID or port ID. For example, all entries for VSAN A are stored sequentially, followed by entries for VSAN B, and so on.

In particular embodiments, NPIV-VSAN rule set 210 also contains a source FCID field 806 that contains the FCID address of the host or virtual device transmitting the data frame. Unlike VSAN data, in particular embodiments FCID data may be stored in the frame header before it is received at switch 102. A destination FCID field 808 stores the FCID of the destination end device. In one embodiment, the field and area portions of the destination FCID are ignored while searching for a rule. Fields 802 to 808 may be described as conditional fields that are used to identify one or more specific incoming data frames. For example, an incoming data frame may be identified as being in VSAN C, coming in on ingress port P3, having a source FCID (source host device) of 15.3.4. Such a data frame may have one or more entries in rule set 210.

In particular embodiments, a VSAN ID-new field 810 stores a new VSAN ID that may be assigned to a data frame. As described in more detail below, the VSAN ID in the header is replaced with the VSAN ID stored in field 810. The new VSAN ID is the actual VSAN of the data frame and corresponds to the VSAN of the host device which transmitted the frame, rather than the VSAN of the switch port where the frame was received. In one embodiment, the new VSAN ID, which may be characterized as the authentic VSAN ID, is derived by the switch using fabric login table 322 and DPVM table 314. An example of this process is described in FIG. 10. In another embodiment, there may also be an egress or output port ID field that stores an identifier for the output port from which a data frame will routed to its destination.

In one embodiment, the VSAN of the output port will correspond to the VSAN indicated in VSAN ID-new field 810.

In particular embodiments, NPIV-VSAN rule set 210 may build on (or be a superset of) a zone permit rules table (not shown). As noted earlier, devices in a VSAN may be divided into zones such that only devices, such as hosts and storage devices, in a zone may communicate or perform certain operations with one another and not with devices outside its zone, even if they are in the same VSAN. Devices not in a VSAN, but in a SAN, may also be divided into zones. In one example, a zone may be based on the operating system of a device, for example, a VSAN may have a Unix zone, a Windows zone, and so on, thereby preventing interference between devices running in different operating systems. To regulate and keep track of zones, a switch may have a zone permit rules table. A zone table may consist of VSAN field 802, ingress PortID field 804, source FCID field 806, and destination FCID field 808. In particular embodiments, NPIV-VSAN rule set 210 is an extension of a permit rules tables by adding one or more additional fields, one of which is VSAN ID-new field for storing an identifier of the actual VSAN of the source host device. In another embodiment, the egress or output port ID field described above in rule set 210 may be part of a zone permit rules table. In another embodiment, VSAN ID-new field 810 and an egress port ID field are in a separate table, for example a table having one or two columns, or a data set that is linked or indexed from a permit rules tables.

FIG. 9 is a flow diagram of an example process of establishing a new connection between a physical or virtual host device and a switch in accordance with particular embodiments. Steps of the methods shown and described need not be performed (and in some implementations are not performed) in the order indicated. Some implementations of these methods may include more or fewer steps than those described. As described, a virtual or physical host has a WWN assigned to it by a network administrator or by an automated process within the network that ensures that the new host is receiving a unique WWN. At step 902 the host is either physically connected via the host's N port to an F port of a switch, or other type of port if the switch is not a Fibre Channel switch using NPIV. In other embodiments, alternative suitable connection standards may be used to establish a connection, such as wireless protocols and connections based on other wired networking protocols and standards. If the host is, for example, a virtual server and a physical NPIV connection already exists, the server process initializes execution within its physical host device. Virtualization of a host device, such as a server, thereby creating multiple processes or virtual servers in a host device, may be implemented using VMWare, available from VMWare, Inc. of Palo Alto, Calif.

At step 904 the host device transmits a data frame containing the device's WWN to the switch. In one embodiment this transmission is the first communication between the two components and is performed by the host device. More specifically, it is made upon detection by the host device of a connection being made with a switch port or upon initialization of the virtual host device software (e.g., VMWare), that is, upon creation of the virtual host. At step 906 the switch, after receiving the WWN via a particular port, in one embodiment, generates an FCID address for the new device. This may be done by software in the switch or by a hardware component. In the particular embodiment, the field and area segments are generated randomly. In another embodiment, the switch is provided with an FCID via persistent FCID table 316. The device WWN is used to find a corresponding entry in table 316 and the associated FCID is used as the FCID of the new host device. In this embodiment, persistent FCID table 316 overrides the switch software with respect to assigning an FCID. In another embodiment, a network administrator assigns the FCID to the new device. In particular embodiments, the new host device is given an FCID that is unique with respect to FCIDs assigned to other virtual devices and the physical host device behind the same switch port. For example, devices 302, 304 and 110 in FIG. 3 each obtain unique FCIDs. This may be ensured by the switch software, so that if a network administrator attempts to assign an FCID to the new device that is not unique to other FCIDs behind the same switch port, switch software will prevent such an assignment.

At step 908 the device's WWN, the assigned source FCID, and the input port ID are stored in fabric login table 322. Using DPVM table 314, the switch ascertains the VSAN of the new device. However, the data frame from a new virtual host device when first received at the switch may have been received via a switch port designated to a different VSAN, specifically, the VSAN of the physical host device when the physical host was first connected to the switch. As described below, in particular embodiments, this inconsistent VSAN coordination does not prevent the virtual host device from: 1) executing on a physical host device in a different VSAN; 2) sharing the physical connection between the physical host and the switch for communication; and 3) sharing the same switch F port even though the port is designated to a different VSAN. At step 910 the VSAN of the new virtual device (as determined using DPVM table 314) is stored in table 322.

If the new host is a physical device and the NPIV connection between the host and the switch does not exist, in particular embodiments the switch may designate the port to be in the same VSAN as the newly connected device (the VSAN being determined using DPVM table 314). In other embodiments, certain ports may be pre-designated to be in certain VSANs and the new device is connected by the network administrator to the switch via a port known to be in the same VSAN as the device. This may be done, for example, by a network administrator who knows, one, which VSAN the new device should be in and, two, the VSAN-designations for the switch ports.

Figure 11A:
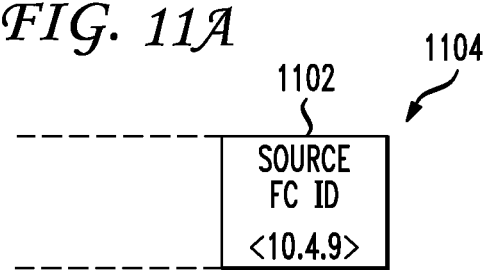
FIGS. 11A, 11B and 11C shows a header of a data frame at various stages of transmission through a switch in accordance with particular embodiments.
Figure 11B:
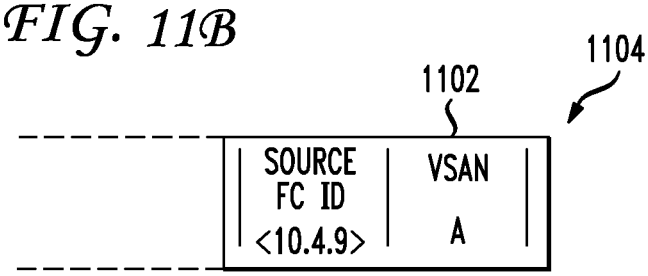
Figure 11C:
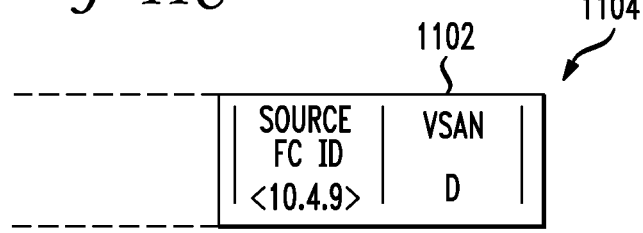

FIG. 10 is a flow diagram of an example process of modifying a VSAN ID in a data frame header upon receiving a data frame at a switch via a connection with a host device in accordance with particular embodiments. Steps of the methods shown and described need not be performed (and in some implementations are not performed) in the order indicated. Some implementations of these methods may include more or fewer steps than those described. In particular embodiments, the example provided in the flow diagram utilizes the NPIV-VSAN rule set 210 to implement a rewrite of the VSAN identifier in a frame header, the rewrite performed by VSAN rewrite module 212 as shown in FIG. 2. In other particular embodiments, the VSAN rewrite may be performed by port logic 214 or processor 208. At step 1002, switch 102 receives a data frame at one of its F-ports. For purposes of illustration, the data frame originates from a virtual server (WWN=2A: 04. . . EB; FCID=10.4.9) in VSAN D executing on a host server in VSAN A having an NPIV connection to an F-port P3, also in VSAN A. The data frame is destined for a device having FCID=10.6.3 in VSAN D, the same VSAN as the virtual server. Further, assume that the switch is connected to another host device also having FCID=10.6.3, but operating in VSAN A. FIGS. 11A, 11B, and 11C are block diagrams showing examples of relevant data contained in a data frame header at various stages in the process. FIG. 11A shows a header 1102 containing an FCID <10.4.9> of a data frame 1104 as the frame is received at port P3. Other data may also be stored in header 1102 but are not shown in the figures.

As described above, in particular embodiments, because host devices may not be VSAN-aware when the frame is received at the switch, the frame may not have VSAN data associated with it. At step 1004 the frame, which includes the FCID <10.4.9> of the virtual server, is processed by port logic 214 where the port VSAN ID may be added to the frame header or other portion of the frame. FIG. 11B shows header 1102 of frame 1104 storing FCID <10.4.9> and a VSAN A identifier.

In particular embodiments, at step 1006, VSAN rewrite module 212 examines data frame 1104 and may use VSAN ID A to locate a specific rule in rule set 210. In other particular embodiments, module 212 may use port ID (P3), which may also be contained in header 1102. In another embodiment, both may be used, together with the source FCID, to locate a specific rule in NPIV-VSAN rule set 210 by first identifying all rules for a particular VSAN, such as VSAN A. As described in FIG. 8, in one embodiment, rule set 210 has a VSAN ID field 802 and a Port ID field 804. As noted, in one embodiment, the port ID is not used to locate the relevant rules and only the VSAN ID is used, which may result in an initial higher number of rules given that numerous ports may be designated to VSAN A. In another embodiment, the VSAN identifier is not used and only the port ID is used which may result in fewer rules initially. At step 1008, VSAN rewrite module 212 uses the FCID to locate a specific rule in the subset of rules ascertained at step 1006 from rule set 210 which, as described above, have a source FCID field 806. In another embodiment, the FCID is used initially to locate the specific rule or rules from set 210 and the initial narrowing of rules is not performed.

At step 1010 module 212 examines the specific VSAN rewrite rule record and replaces the VSAN ID A in header 1102 with the VSAN identifier of the virtual server stored in VSAN-new field 810. As shown in FIG. 11C, VSAN ID A has been replaced with VSAN ID D. If the VSAN indicated in header 1102 is the actual VSAN of the destination host, no rewrite is performed. In other embodiments, there may not be a rule in NPIV-VSAN rule set 210 for the data frame or the VSAN-new field 810 may store the same VSAN identifier as the one stored in the frame header, in which case a rewrite does not result in a VSAN change. At step 1012 switching logic 206 uses forwarding table 320 to forward the data frame to its intended destination using the new VSAN ID (or unchanged VSAN ID). For example, data frame 1104 will be forwarded to the host device having FCID <10.6.3> in VSAN D, rather than to the host having the same FCID in VSAN A or in any other VSAN. If the destination FCID is in a different domain, that is, the destination host device is connected to a different switch (thus having a different domain ID segment in its FCID, e.g., <20.6.3>) the entire address is stored in the forwarding table. If the receiving host device is connected to the same switch as the transmitting host, in one embodiment, only the field and area segments of the FCID need to be stored in the forwarding table. In another embodiment rule set 210 and forwarding table 320 may be combined. For example, the VSAN ID, destination FCID and output port fields of rule set 210 may be used for forwarding data. In another embodiment forwarding data may be stored in rule set 210. As described above, NPIV-VSAN rule set 210 may be an extension of a zone permit rules table where, for example, VSAN ID-new field 810 is appended to an existing permit rules table.

Figure 12:
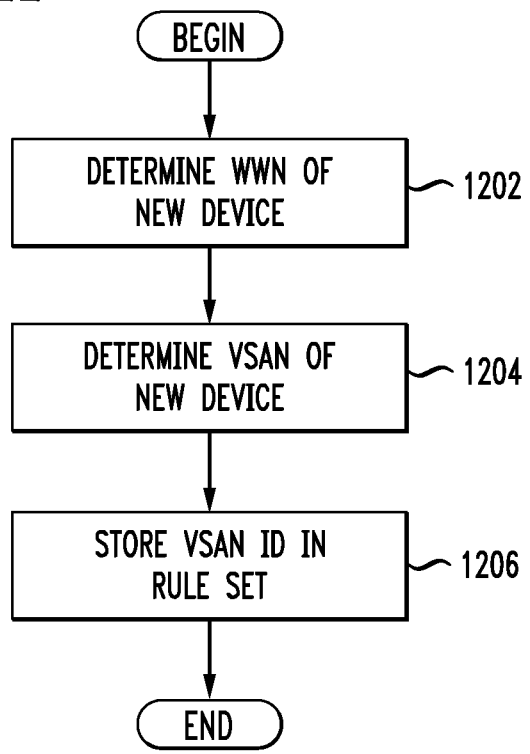
FIG. 12 is a flow diagram of an example process of ascertaining the actual VSAN of a device and storing the ID in VSAN ID-new field of NPIV-VSAN rule set in accordance with particular embodiments.

FIG. 12 is a flow diagram of an example process of ascertaining the actual VSAN of a device and storing the ID in VSAN ID-new field 810 of NPIV-VSAN rule set 210 in accordance with particular embodiments. In one embodiment, as noted above, a rules record in rule set 210 may be created when a host device or virtual host device is being assigned an FCID, most often when establishing a connection with the switch. Creation of the rules record in rule set 210 may be done by switching logic 206, processor 208, VSAN rewrite module 212, or other suitable switch component. If it is determined by a network administrator that a new host should operate in a specific VSAN, the VSAN is selected and associated with the host's WWN in DPVM table 314. As noted above, fabric login table 322 stores WWN-FCID relationships for host devices in the network. At step 1202 VSAN rewrite module 212 in switch 102 or a network administrator uses the FCID to look-up the device's WWN in fabric login table 322. At step 1204 module 212 or the network administrator uses the WWN to look up the device's VSAN using DPVM table 314. At step 1206 module 212 or a network administrator stores the VSAN ID of the new device in VSAN-new field 810.

Figure 13:
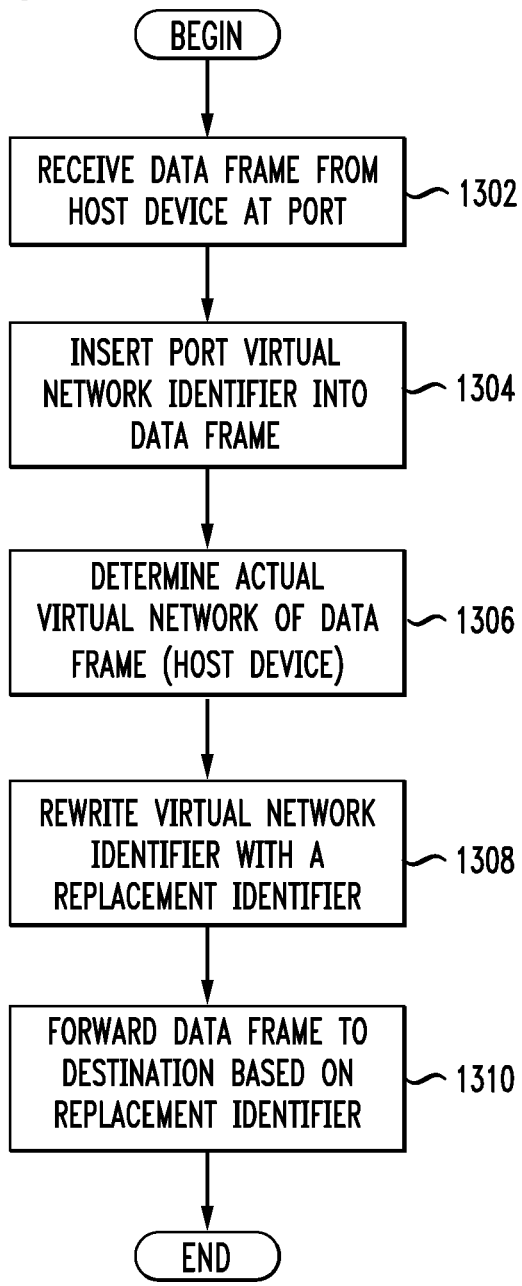
FIG. 13 is a flow diagram of an example process of performing a virtual network identifier rewrite in a switch in accordance with particular embodiments.

FIG. 13 is a flow diagram of an example process of performing a virtual network identifier rewrite in a switch in accordance with particular embodiments.

Steps of the methods shown and described need not be performed (and in some implementations are not performed) in the order indicated. Some implementations of these methods may include more or fewer steps than those described. At step 1302 a switch receives a data frame from a virtual or physical host device at a specific port. In one embodiment the switch is a Fibre Channel switch and the port is an F port. At step 1304 an identifier identifying the virtual network to which the port is assigned to is inserted into the data frame. The switch may support multiple virtual networks. In particular embodiments, the virtual network identifier is inserted into the header of the data frame. One example of a virtual network technology is VSAN. At step 1306 a virtual network rewrite module, such as VSAN rewrite module 212 in the switch determines the actual virtual network of the host device transmitting the data frame. In particular embodiments where the virtual network is a VSAN, this may done by examining NPIV-VSAN rule set 210 using one or more of various indexes, including but not limited to source FCID address, ingress port ID, VSAN ID (inserted into the data frame at step 1304), and others. In particular embodiments, VSAN ID-new field 810 in rule set 210 provides the actual VSAN of the host device. For switches not using VSAN or NPIV standards, a rule set similar or identical to rule set 210 may be used with appropriate changes made to the field headings based on the standards used for connectivity and network virtualization. At step 1308 a virtual network rewrite module in the switch inserts the actual or replacement virtual network identifier into the data frame at step 1304 is replaced with the actual virtual network identifier determined at step 1306. At step 1310 the data frame is forwarded via an egress port of the switch to a destination host device based at least in part on the replacement virtual network identifier at which point the process is complete.

Although illustrative embodiments and applications of this invention are shown and described herein, many variations and modifications are possible which remain within the concept, scope, and spirit of the invention, and these variations would become clear to those of ordinary skill in the art after perusal of this application. For example, although VSAN is used to describe particular embodiments, other logic or virtual switching and networking techniques may be used. In another example, although certain standards and switch types are used to illustrate particular embodiments, standards other than those described, such as NPIV, Fibre Channel protocol, and so on, may be used. Other types of switches may have fewer or more tables, rule sets, and the like depending on the switch type and protocols utilized by the switch. Accordingly, the embodiments described are to be considered as illustrative and not restrictive, and the invention is not to be limited to the details given herein, but may be modified within the scope and equivalents of the appended claims.

I claim:

1. An apparatus, comprising:
a processor; and
a memory, at least one of the processor or the memory being configured for:
receiving a data frame at an ingress port of a switch, the data frame transmitted from a first host device assigned to operate in a first virtual network;
determining that the data frame originated from the first host device operating in the first virtual network;
rewriting an initial virtual network identifier in the data frame with a replacement virtual network identifier that corresponds to the first virtual network, thereby facilitating routing of the data frame to an intended destination host device, wherein the initial network identifier corresponds to a second virtual network; and
forwarding the data frame to the destination host device having a destination address in the first virtual network.

2. The apparatus as recited in claim 1, at least one of the processor or the memory being further configured for:

inserting into the data frame the initial virtual network identifier corresponding to the second virtual network.

3. The apparatus as recited in claim 1, wherein the first host device executes on a physical host device assigned to operate in the second virtual network and the data frame contains a source address corresponding to the first host device.

4. The apparatus as recited in claim 1, wherein determining that the data frame originated from the first host device operating in the first virtual network further comprises:
searching a virtual network identifier rewrite rule set storing the replacement virtual network identifier using the initial virtual network identifier to locate a rule.

5. The apparatus as recited in claim 4, wherein searching further comprises:
utilizing a source host device address in conjunction with the initial virtual network identifier to locate the rule.

6. The apparatus as recited in claim 1 wherein determining that the data frame originated from the first host device operating in the first virtual network further comprises:
searching a virtual network identifier rewrite rule set storing the replacement virtual network identifier using an ingress port identifier to locate the rule.

7. The apparatus as recited in claim 6, wherein searching further comprises:
utilizing a source host device address in conjunction with the ingress port identifier to locate the rule.

8. The apparatus as recited in claim 1, wherein determining that the data frame originated from the first host device operating in the first virtual network further comprises:
searching a virtual network identifier rewrite rule set using a source host device address.

9. A non-transitory computer-readable storage medium storing thereon computer-readable instructions, comprising:
instructions for obtaining a data frame received at an ingress port of a switch, the data frame transmitted from a first host device assigned to operate in a first virtual network;
instructions for determining that the data frame originated from the first host device operating in the first virtual network;
instructions for rewriting an initial virtual network identifier in the data frame with a replacement virtual network identifier that corresponds to the first virtual network, thereby facilitating routing of the data frame to an intended destination host device, wherein the initial network identifier corresponds to a second virtual network; and
instructions for forwarding the data frame to the destination host device having a destination address in the first virtual network.

10. The non-transitory computer-readable medium as recited in claim 9, further comprising:
instructions for inserting into the data frame the initial virtual network identifier corresponding to the second virtual network.

11. The non-transitory computer-readable medium as recited in claim 9, wherein the first host device executes on a physical host device assigned to operate in the second virtual network and the data frame contains a source address corresponding to the first host device.

12. The non-transitory computer-readable medium as recited in claim 9, wherein the instructions for determining further comprises:
instructions for searching a virtual network identifier rewrite rule set storing the replacement virtual network identifier using the initial virtual network identifier to locate a rule.

13. The non-transitory computer-readable medium as recited in claim 12, wherein the instructions for searching further comprises:
instructions for utilizing a source host device address in conjunction with the initial virtual network identifier to locate the rule.

14. The non-transitory computer-readable medium as recited in claim 9, wherein the instructions for determining further comprises:
instructions for searching a virtual network identifier rewrite rule set storing the replacement virtual network identifier using an ingress port identifier to locate the rule.

15. The non-transitory computer-readable medium as recited in claim 14, wherein the instructions for searching further comprises:
instructions for utilizing a source host device address in conjunction with the ingress port identifier to locate the rule.

16. The non-transitory computer-readable medium as recited in claim 9, wherein the instructions for determining further comprises:
instructions for searching a virtual network identifier rewrite rule set using a source host device address.

17. A method, comprising:
receiving a data frame at an ingress port of a switch, the data frame transmitted from a first host device assigned to operate in a first virtual network;
determining that the data frame originated from the first host device operating in the first virtual network;
rewriting an initial virtual network identifier in the data frame with a replacement virtual network identifier that corresponds to the first virtual network, thereby facilitating routing of the data frame to an intended destination host device, wherein the initial network identifier corresponds to a second virtual network; and
forwarding the data frame to the destination host device having a destination address in the first virtual network.

18. The method as recited in claim 17, further comprising:
inserting into the data frame the initial virtual network identifier corresponding to the second virtual network.

19. The method as recited in claim 17, wherein the first host device executes on a physical host device assigned to operate in the second virtual network and the data frame contains a source address corresponding to the first host device.

20. The method as recited in claim 17, wherein the step of determining further comprises:
searching a virtual network identifier rewrite rule set storing the replacement virtual network identifier using the initial virtual network identifier to locate a rule.

* * * * *